(12) United States Patent
Kojima et al.

(10) Patent No.: US 8,142,930 B2
(45) Date of Patent: Mar. 27, 2012

(54) NEGATIVE ELECTRODE ACTIVE MATERIAL FOR CHARGING DEVICE

(75) Inventors: Kenji Kojima, Shinjuku-ku (JP); Nobuo Ando, Shinjuku-ku (JP); Tsutomu Fujii, Shinjuku-ku (JP); Hiromoto Taguchi, Shinjuku-ku (JP); Osamu Hatozaki, Shinjuku-ku (JP); Yukinori Hato, Shinjuku-ku (JP); Chisato Marumo, Shinjuku-ku (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 851 days.

(21) Appl. No.: 11/911,630

(22) PCT Filed: Apr. 25, 2006

(86) PCT No.: PCT/JP2006/308666
§ 371 (c)(1),
(2), (4) Date: Oct. 15, 2007

(87) PCT Pub. No.: WO2006/118120
PCT Pub. Date: Nov. 9, 2006

(65) Prior Publication Data
US 2009/0023066 A1 Jan. 22, 2009

(30) Foreign Application Priority Data
Apr. 26, 2005 (JP) ................. 2005-128716

(51) Int. Cl.
*H01M 4/13* (2010.01)
*C01B 31/04* (2006.01)

(52) U.S. Cl. ............. 429/213; 429/213.8; 429/209; 423/448

(58) Field of Classification Search ............. None
See application file for complete search history.

(56) References Cited

U.S. PATENT DOCUMENTS

| | | | |
|---|---|---|---|
| 5,753,387 A | 5/1998 | Takami et al. | |
| 6,258,487 B1 * | 7/2001 | Kitoh et al. | 429/233 |
| 6,631,073 B1 * | 10/2003 | Sakata et al. | 361/502 |

FOREIGN PATENT DOCUMENTS

| | | |
|---|---|---|
| EP | 1 115 130 A1 | 7/2001 |
| JP | 1-161677 A | 6/1989 |
| JP | 6-236755 | 8/1994 |
| JP | 8-107048 | 4/1996 |
| JP | 9-55342 | 2/1997 |
| JP | 9-213335 | 8/1997 |
| JP | 9-232190 | 9/1997 |
| JP | 10-27612 | 1/1998 |
| JP | 2000-348726 | 12/2000 |
| JP | 2002-175810 | 6/2002 |
| JP | 2002-298849 | 10/2002 |
| JP | 2003-31220 | 1/2003 |
| JP | 2003-109875 | 4/2003 |
| JP | 2003-272625 | 9/2003 |
| JP | 2003-282369 A | 10/2003 |
| JP | 2003-346801 | 12/2003 |
| JP | 2003-346802 | 12/2003 |
| JP | 2003-346803 | 12/2003 |
| JP | 2004-39648 | 2/2004 |
| JP | 2004-79321 | 3/2004 |
| WO | 98/33227 | 7/1998 |

OTHER PUBLICATIONS

Machine translation of JP 2003-282369, retrieved from http://www.ipdl.inpit.go.jp/homepg_e.ipdl on Feb. 4, 2011.*
Extended Supplementary European Search Report issued Sep. 1, 2010 in European Application No. 06 73 2326.

* cited by examiner

*Primary Examiner* — Cynthia Lee
(74) *Attorney, Agent, or Firm* — Oblon, Spivak, McClelland, Maier & Neustadt, L.L.P.

(57) ABSTRACT

To present a carbon material which provides an electrical storage device not only ensuring a high energy density but also realizing a high output and an excellent low temperature performance.

A negative electrode active material for an electrical storage device employing an aprotic organic solvent electrolyte solution containing a lithium salt as an electrolytes characterized in that it is made of a carbon material having a specific surface area of from 0.01 to 50 m²/g and a total mesopore volume of from 0.005 to 1.0 cc/g, wherein volumes of mesopores having pore diameters of from 100 to 400 Å occupy at least 25% of the total mesopore volume.

11 Claims, No Drawings

NEGATIVE ELECTRODE ACTIVE MATERIAL FOR CHARGING DEVICE

TECHNICAL FIELD

The present invention relates to a negative electrode active material for an electrical storage device employing an aprotic organic solvent electrolyte solution containing a lithium salt as an electrolyte.

BACKGROUND ART

In recent years, a so-called lithium ion secondary battery using as a negative electrode a carbon material is such as graphite and using as a positive electrode a lithium-containing metal oxide such as $LiCoO_2$, which has a large capacity and is expected as a promising electrical storage device, has been used practically as the main power source for notebook computers and mobile phones. The lithium ion secondary battery is a so-called rocking chair battery such that after it is assembled, lithium ions are supplied from the lithium-containing metal oxide as the positive electrode to the negative electrode by charging the battery, and the lithium ions in the negative electrode are returned to the positive electrode by discharging the battery, and is characterized by having a high voltage, a large capacity and high safety.

Further, in recent years, attention has been paid to an electrical storage device also called a hybrid capacitor comprising a combination of storage principles of a lithium ion secondary battery and an electric double layer capacitor. As one of such devices, a capacitor has been proposed in which a negative electrode capable of absorbing and desorbing lithium ions is brought into contact with lithium metal so that lithium ions be preliminarily doped by a chemical or electrochemical method to lower the negative electrode potential, thereby to significantly increase the energy density (Patent Documents 1 to 4).

On the other hand, such an electrical storage device provided with an aprotic organic solvent electrolyte solution containing a lithium salt is being developed as a new electrical storage device (main power source and auxiliary power source) to be substituted for a lead battery for an electric car or a hybrid car to be substituted for a gasoline-powered car in an environment where environmental problems are highlighted. Particularly, due to enhancement of electrical installations and equipments for vehicles, the electrical storage device is required to have not only a higher energy density but also a high output and excellent low temperature performance.

In order to meet such requirements, it has been proposed to define the pore diameter and pore volume with respect to a negative electrode active material for an electrical storage device, for example, in Patent Document 5. Patent Document 5 discloses that among carbon materials having a similar BET specific surface area, the initial charge and discharge efficiency may substantially be different, whereby optimization of the initial efficiency by defining the BET specific surface area is difficult, and for this reason, by selecting specific ranges of the micropore amount and the mesopore amount, it is possible to accomplish a high charge and discharge efficiency. However, in spite of the object to attain a high capacity and high output, such an object has not necessarily been adequately accomplished.

Further, Patent Document 6 proposes graphite particles having the macropore volume, mesopore volume and micropore volume defined, as a negative electrode active material for a non-aqueous secondary battery. Patent Document 6 specifically defines that the graphite particles have a specific surface area of from 2.5 to 6 $m^2/g$ and a total pore volume of 0.035 cc/g, wherein the macropore volume occupies at least 40% of the total pore volume. However, this also does not necessarily sufficiently accomplish the object to attain a high capacity and high output.

Further, Patent Document 7 proposes a negative electrode active material wherein volumes of pores having pore diameters of $X \pm \alpha$ nm ($3.0 \leq X \leq 10$, $\alpha=1.0$, such pore diameter distribution range) occupy at least 15% of the total mesopore volume. Patent Document 7 specifically discloses that a material wherein volumes of pores having pore diameters within a range of from 20 to 110 Å occupy at least 15% of the total mesopore volume, is useful as a negative electrode active material. However, this also does not adequately accomplish the object to attain a high capacity and high output.

Patent Document 1: JP-A-8-107048
Patent Document 2: JP-A-9-55342
Patent Document 3: JP-A-9-232190
Patent Document 4: PCT Publication No. WO98/033227
Patent Document 5: JP-A-2003-346801
Patent Document 6: JP-A-2000-348726
Patent Document 7: U.S. Pat. No. 6,631,073

DISCLOSURE OF THE INVENTION

Object to be Accomplished by the Invention

It is an object of the present invention to provide a carbon material which is a negative electrode active material for an electrical storage device employing an aprotic organic solvent electrolyte solution containing a lithium salt as an electrolyte and which provides an electrical storage device which presents not only a high energy density but also a high output and excellent low temperature performance.

Means to Accomplish the Object

To accomplish the above object, the present inventors have conducted an extensive research and as a result, have found it possible to accomplish the above object by using, as the negative electrode active material for the above electrical storage device, a carbon material which has a specific surface area within a specific range of from 0.01 to 50 $m^2/g$ and a mesopore volume of from 0.005 to 1.0 cc/g, wherein volumes of mesopores having pore diameters of from 100 to 400 Å occupy at least 25% of the total mesopore volume. The present invention has been accomplished on the basis of this discovery.

The negative electrode material made of the carbon material having the above mentioned pore characteristics in the present invention is novel. Namely, heretofore, with a carbon material as a negative electrode active material for e.g. a lithium ion secondary battery, it was impossible to control the mesopore volume and the micropore volume independently. Even if it was attempted to provide a mesopore volume, the micropore volume was necessarily increased, and as a result, also the specific surface area of the carbon material tended to be too large. If the specific surface area is large, the charge and discharge efficiency, or the coulomb efficiency is likely to deteriorate.

In the present invention, by adopting a means whereby the mesopore volume and the micropore volume can be independently controlled, a negative electrode active material made of a carbon material having a certain specific volume of mesopores having certain specific pore diameters, has been successfully developed whereby it is possible to sufficiently secure easy mobility of lithium ions during a high output or at a low temperature, while it has a specific surface area within a certain specific range.

Thus, the present invention provides the following.
(1) A negative electrode active material for an electrical storage device employing an aprotic organic solvent electrolyte solution containing a lithium salt as an electrolyte, characterized in that it is made of a carbon material having a specific surface area of from 0.01 to 50 m²/g and a total mesopore volume of from 0.005 to 1.0 cc/g, wherein volumes of mesopores having pore diameters of from 100 to 400 Å occupy at least 25% of the total mesopore volume.
(2) The negative electrode active material for an electrical storage device according to the above (1), wherein the carbon material is soft carbon, hard carbon or a polyacene material.
(3) The negative electrode active material for an electrical storage device according to the above (1) or (2), wherein the carbon material is one obtained by thermally treating a precursor for the carbon material at a temperature of from 600° C. to 1,500° C. in the presence of a transition metal-containing compound.
(4) The negative electrode active material for an electrical storage device according to the above (3), wherein the transition metal is nickel and/or iron.
(5) A lithium ion secondary battery wherein the negative electrode active material is the negative electrode active material as defined in any one of the above (1) to (4).
(6) A lithium ion capacitor wherein the positive electrode active material is a material capable of reversibly adsorbing or desorbing lithium ions and/or anions, the negative electrode active material is the negative electrode active material as defined in any one of the above (1) to (4), and the negative electrode and/or the positive electrode is doped with lithium ions so that the positive electrode potential after short-circuiting the positive electrode and the negative electrode becomes at most 2.0 V (vs Li/Li⁺).

Effects of the Invention

According to the present invention, it is possible to provide an electrical storage device excellent in low-temperature performance with a high energy density and a high output, such as a lithium ion secondary battery or a lithium ion capacitor having a negative electrode and/or a positive electrode preliminarily doped with lithium ions so that the positive electrode potential after short-circuiting the positive electrode and the negative electrode becomes at most 2.0 V (vs Li/Li⁺).

In the present invention, the mechanism how an electrical storage device having such excellent properties is obtainable by using the above negative electrode active material made of a carbon material, is not necessarily clearly understood but is considered to be as follows.

In general, an electrical storage device excellent in low temperature performance with a high output is required to have a low resistance, and for such purpose, it is necessary to reduce so-called charge transfer resistance of lithium ions. Particularly in the vicinity of the interface of the negative electrode active material, a sufficient concentration-following property of lithium ions is required even during large current charging or discharging or at a low temperature, and for this purpose, sufficient transferability (mobility) of solvated lithium ions will be required. It is considered that in the present invention, by using a negative electrode material of a carbon material having the above mentioned specific surface area and the specific pore characteristics of mesopores, the mobility of lithium ions during a high output or at a low temperature has been sufficiently secured. Further, heretofore, in order to realize mesopores, it was required to carry out activation by means of steam or an alkali, but by such a method, micropores were inevitably simultaneously formed, whereby the specific surface area was consequently increased, thus leading to deterioration of the coulomb efficiency. However, according to the present invention, it has been made possible to increase only the mesopore volume without increasing the micropore volume, whereby it has been made possible to obtain an electrical storage device having such excellent characteristics.

BEST MODE FOR CARRYING OUT THE INVENTION

The negative electrode active material of the present invention is effective for an electrical storage device provided with an aprotic organic solvent electrolyte solution containing a lithium salt as an electrolyte and is formed of a carbon material having a specific surface area of from 0.01 to 50 m²/g and a total mesopore volume of from 0.005 to 1.0 cc/g, wherein volumes of mesopores having pore diameters of from 100 to 400 Å occupy at least 25% of the total mesopore volume.

The carbon material to form the negative electrode active material of the present invention is composed of a material reversibly doped with lithium ions. Although its type is not particularly limited, a preferred material may, for example, be a soft carbon such as petroleum coke, coal pitch coke or polyvinyl chloride carbon, a hard carbon such as a phenol resin carbon or a furan resin carbon, or a polyacene material (hereinafter referred to also as PAS).

As the negative electrode active material of the present invention, PAS may suitably be used. PAS has an amorphous structure, and it is free from a structural change such as swelling or shrinkage against doping or dedoping of lithium ions, whereby it is excellent in cycling characteristics, and it has an isotropic molecular structure (high-order structure) against doping or dedoping of lithium ions, whereby it is excellent also in rapid charging or rapid discharging, such being desirable. An aromatic condensed polymer as a precursor of PAS is a condensation product of an aromatic hydrocarbon compound and an aldehyde. As the aromatic hydrocarbon compound, a so-called phenol may suitably be employed such as phenol, cresol or xylenol. For example, a methylene-bisphenol represented by the following formula:

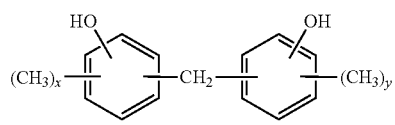

(wherein each of x and y which are independent of each other, is 0, 1 or 2), or a hydroxy-biphenyl, or a hydroxynaphthalene may be used.

Further, as the above aromatic condensed polymer, it is also possible to employ a modified aromatic condensed polymer having the above aromatic hydrocarbon compound having a phenolic hydroxyl group partly substituted by an aromatic hydrocarbon compound having no phenolic hydroxyl group such as xylene, toluene or aniline, for example, a condensate of phenol, xylene and formaldehyde. Further, it is possible to employ a modified aromatic polymer substituted by melamine or urea, and a furan resin is also suitable.

PAS is preferably prepared as follows. Namely, the above mentioned aromatic condensed polymer is gradually heated to a proper temperature of from 400 to 800° C. in a non-acidic atmosphere (including vacuum) to obtain an insoluble, infusible substrate having an atomic ratio of hydrogen atoms/carbon atoms (hereinafter referred to as H/C) being from 0.5 to 0.05, preferably from 0.35 to 0.10. Such an insoluble, infusible substrate shows, in its X-ray diffraction (CuKα), a main peak at a position of 2θ being at most 24° and further has, in addition to the main peak, other broad peaks between 41 and 46°. Namely, such an insoluble, infusible substrate has a polyacene skeleton structure having an aromatic polycyclic structure developed to a proper degree and also has an amorphous structure, whereby it can be doped stably with lithium ions.

The negative electrode active material of the present invention has a specific surface area of from 0.01 to 50 m$^2$/g. If the specific surface area exceeds 50 m$^2$/g, the charge and discharge efficiency of lithium ions tends to be low, such being undesirable. Further, if it is smaller than 0.01 m$^2$/g, the amount of the electrolyte to be kept tends to be small, and the resistance tends to be large, such being undesirable. The specific surface area is particularly preferably from 0.1 to 20 m$^2$/g.

Further, the negative electrode active material of the present invention has a total mesopore volume of from 0.005 to 1.0 cc/g. If the total mesopore volume is smaller than 0.005 cc/g, the mobility of the solvated lithium ions tends to deteriorate, and during a high output or at a low temperature, the lithium ion concentration in the vicinity of the interface of the negative electrode active material tends to hardly follow, such being undesirable. On the other hand, if it exceeds 1.0 cc/g, the true density of the negative electrode active material tends to be low, whereby the capacity per electrode volume tends to be small, such being undesirable. Such a total mesopore volume is preferably from 0.006 to 0.8 cc/g.

Further, in the negative electrode active material of the present invention, volumes of mesopores having pore diameters of from 100 to 400 Å occupy at least 25% of the total mesopore volume. If the volumes of mesopores having such pore diameters are smaller than 25% of the total mesopore volume, the mobility of the solvated lithium ions tends to deteriorate, and during a high output or at a low temperature, the lithium ion concentration in the vicinity of the interface of the negative electrode active material tends to hardly follow, such being undesirable. The upper limit for the volumes of mesopores having such pore diameters to the total mesopore volume is not necessarily present. However, it is usually preferably at most about 90%, taking into consideration of the continuity to the volumes of mesopores of from 400 to 500 Å. Especially, the volumes of mesopores having the above pore diameters are preferably from 30 to 85% of the total mesopore volume.

In the present invention, micropores, mesopores and macropores of a negative electrode active material are defined in accordance with the classification of IUPAC (International Union of Pure and Applied Chemistry) such that a pore diameter of less than 2 nm is a micropore, and a pore diameter of from 2 to 50 nm is a mesopore and a pore diameter exceeding 50 nm is a macropore. Here, the pore volume of mesopores was obtained by the analysis of the desorption isotherm by DH method (Dollimore-Heal method).

In the present invention, the total mesopore volume being from 0.005 to 1.0 cc/g, and the volumes of mesopores having pore diameters of from 100 to 400 Å occupying at least 25% of the total mesopore volume, will be described in detail by means of a concept of adsorption isotherm. A pore diameter of 20 Å corresponds to a relative pressure of about 0.2 in the adsorption isotherm; 100 Å corresponds to about 0.8; 400 Å corresponds to about 0.94; and a pore diameter of 500 Å corresponds to about 0.96. The total mesopore volume being from 0.005 to 1.0 cc/g means that the inclination of a linear line connecting the adsorbed amounts at relative pressures of 0.2 and 0.96 is required to be a value within a certain range, and volumes of mesopores having pore diameters of from 100 to 400 Å occupying at least 25% of the total mesopore volume means that the pore volume obtained from the adsorbed amount (desorbed amount) between a relative pressure of 0.8 and a relative pressure of 0.94 is at least 25% of the pore volume obtained from the adsorbed amount (desorbed amount) between a relative pressure of 0.2 and a relative pressure of 0.96. The shape of the adsorption isotherm corresponds to an adsorption isotherm of a shape which is a gently curved shape with a relatively small inclination from a relative pressure of 0.2 to about 0.8 and sharply rises from a relative pressure of about 0.8 to about 0.94. Namely, the carbon material of the present invention has a specific surface area of at most 50 m$^2$/g as obtained from the adsorption isotherm starting from a relative pressure of 0, and thus presents an adsorption isotherm of a type such that in a low relative pressure range, it does not substantially rise, then gently rises from a relative pressure of 0.2 to about 0.8, and sharply rises with a sharp inclination from a relative pressure of about 0.8.

The average particle diameter of the carbon material for the negative electrode of the present invention is not particularly limited, but it is usually from 0.5 to 30 μm, preferably from 0.5 to 10 μm, particularly preferably from 0.5 to 2 μm. If the average particle diameter is larger than 30 μm, the solvated lithium ions tend to diffuse even to the interior of the negative electrode active material particles and their speed for desorption and adsorption tends to be slow, such being undesirable. On the other hand, if the average particle diameter becomes smaller than 0.5 μm, the material tends to be bulky, and when it is made into an electrode, the density tends to be small, whereby the energy density per unit volume tends to be low, such being undesirable. Further, a large amount of a binder will be required to bond particles to one another, whereby the internal resistance may sometimes increase. Here, the average particle diameter in the present invention is one obtained by a laser diffraction scattering method.

The negative electrode active material having the above-mentioned characteristics of the present invention can be obtained by thermally treating a precursor for the carbon material at a temperature of from 600° C. to 1,500° C. in the presence of a transition metal-containing compound. As the transition metal, iron, ruthenium, osmium, cobalt, rhodium, iridium, nickel or copper may, for example, be used, but nickel and/or iron is particularly preferred. As the above-mentioned transition metal-containing substance, a transition metal salt is preferred, and a nitrate, a sulfate or a hydrochloride may, for example, be mentioned. In use, it is selected taking into consideration the solubility or dispersibility in the solvent, etc.

The method for thermal treatment of the above precursor for the carbon material may, for example, be a method wherein the precursor for the carbon material is immersed in and uniformly impregnated with an aqueous or organic solvent liquid such as an alcohol such as ethanol, having the above-mentioned transition metal salt dissolved or dispersed therein and then sufficiently slowly dried over a long time, followed by thermal treatment. Otherwise, a method may, for example, be mentioned wherein a transition metal salt is mixed directly to the precursor for the carbon material, followed by mechanical ironing by e.g. a ball mill and then by thermal treatment. The type of the above aqueous or organic solvent type medium is preferably selected from solvents capable of uniformly dissolving or dispersing the precursor, since it varies depending upon the compatibility of the precursor for the carbon material and the medium. The drying of the medium after the impregnation is preferably carried out slowly over a long time, so that at the time of evaporating the medium, the solute salt dissolved or dispersed therein should not be pulled to the vicinity of the evaporation surface. It is preferred to heat and evaporate the medium slowly with stirring.

The amount of the transition metal-containing compound to be used, is not particularly limited. Preferably, it is effective to add it within a saturation amount of the transition metal-containing compound soluble in the medium. Preferably, it is usually used in an amount of from about 1 to 30 parts by weight per 100 parts by weight of the precursor for the carbon material. If the amount is less than 1 part by weight, the influence to provide mesopores tends to be small, such being undesirable. On the other hand, if the amount exceeds 30 parts by weight, the transition metal-containing compound is likely to precipitate without being dissolved, or during the thermal treatment, the transition metal-containing compound tends to precipitate, thus leading to a non-uniform reaction, such being undesirable, although such may depend also on the type of the transition metal-containing compound.

The temperature for the above thermal treatment is from 600° C. to 1,500° C., preferably from 800° C. to 1,200° C. The optimum treating temperature varies depending on the type and the amount of the transition metal-containing compound. If the thermal treatment is carried out at a temperature lower than 600° C., the effect to provide mesopores tends to be small. On the other hand, if the temperature is higher than 1,500° C., it will be required to select an electric furnace for high temperature use, and at the same time, the effect to provide mesopores by the addition of the transition metal-containing compound will reach a ceiling at a certain temperature, and such a high temperature will no longer be efficient. The carbon material after the thermal treatment is preferably subjected to acid cleaning. The conditions for the acid cleaning are not particularly limited. However, acid cleaning is usually carried out a few times with 2 N HCl of from 60 to 80° C. Further, in the present invention, such carbon material may be used as it is, as a negative electrode active material, without subjecting it to acid cleaning.

In the present invention, as a means for forming a negative electrode from the above negative electrode active material, a conventional means may be used. Namely, the negative electrode active material powder, a binder and, if necessary, an electrically conductive material and a thickener (such as CMC (carboxymethyl cellulose)) are dispersed in an aqueous or organic solvent to form a slurry. Such a slurry may be applied to the above-mentioned current collector, or such a slurry may preliminarily be formed into a sheet, which may then be bonded to a current collector. The binder to be used here may, for example, be a rubber type binder such as SBR, a fluorinated resin such as polyethylene tetrafluoride or polyvinylidene fluoride, a thermoplastic resin such as polypropylene or polyethylene, or an acrylic resin. The amount of the binder to be used may vary depending upon the electrical conductivity of the negative electrode active material, the shape of the electrode, etc., but it is usually added in a proportion of from 2 to 40 wt % to the negative electrode active material.

The above mentioned electrically conductive material to be used as the case requires, may, for example, be acetylene black, graphite or a metal powder. The amount of the electrically conductive material to be used may vary depending upon the electrical conductivity of the negative electrode active material, the shape of the electrode, etc., but it is suitable to add it in a proportion of from 2 to 40% to the negative electrode active material.

As the organic solvent to form the aprotic organic solvent electrolyte solution in the electrical storage device wherein the negative electrode active material of the present invention is used, ethylene carbonate, propylene carbonate, dimethyl carbonate, diethyl carbonate, γ-butyrolactone, acetonitrile, dimethoxyethane, tetrahydrofuran, dioxolane, methylene chloride or sulfolane, may, for example, be mentioned. Further, a mixed liquid obtained by mixing two or more of such aprotic organic solvents, may also be used.

The electrolyte to be dissolved in the above mentioned single or mixed solvent may be any electrolyte so long as it is an electrolyte capable of forming lithium ions. Such an electrolyte may, for example, be $LiClO_4$, $LiAsF_6$, $LiBF_4$ or $LiPF_6$. Such an electrolyte and the solvent are mixed in a sufficiently dehydrated state to form an electrolyte solution. The concentration of the electrolyte in the electrolyte solution is preferably at least 0.1 mol/liter, more preferably within a range of from 0.5 to 1.5 mol/liter, in order to reduce the internal resistance by the electrolyte solution.

As the electrical storage device wherein the negative electrode active material of the present invention is used, a lithium ion secondary battery, an electrical double layer capacitor and a hybrid capacitor may, for example, be mentioned. For example, with respect to a lithium ion secondary battery, a negative electrode using the negative electrode active material of the present invention may be used in place of the negative electrode in a currently commercially available lithium ion secondary battery. Further, the positive electrode active material is not particularly limited, but, for example, a lithium-containing double oxide capable of electrochemically doping or dedoping lithium ions, represented by the general formula $Li_xM_yO_z$ (M is a metal, or two or more metals) such as $LiCoO_2$ or $LiMn_2O_4$ which is used in a currently commercially available lithium ion secondary battery, or an oxide or sulfide of a transition metal such as manganese, nickel or vanadium, may, for example, be used.

On the other hand, in the case of a hybrid capacitor, the positive electrode active material to be used as a counter electrode of the negative electrode active material of the present invention may be a material capable of reversibly adsorbing or desorbing lithium ions and anions such as tetrafluoroborate. Such a positive electrode active material may be formed of known activated carbon particles. The particle size of the activated carbon may be selected for use within a wide range commonly employed. For example, its median diameter (called also as D50) is at least 2 μm, preferably from 2 to 50 μm, particularly preferably from 2 to 20 μm. Further, the average pore diameter is preferably at most 10 nm, and the specific surface area is preferably from 600 to 3,000 $m^2/g$, particularly preferably from 1,300 to 2,500 $m^2/g$.

The positive electrode is formed of the above activated carbon powder, and a conventional means may be used for its preparation. Namely, the activated carbon powder, a binder, and if necessary, an electroconductive material and a thickener are dispersed in an aqueous or organic solvent to obtain a slurry. Such a slurry is applied to a current collector which is used as the case requires, or such a slurry is preliminarily formed into a sheet, which is then bonded to a current collector. The binder to be used here may, for example, be a rubber-type binder such as SBR, a fluororesin such as polyethylene tetrafluoride or polyvinylidene fluoride, a thermoplastic resin such as polypropylene or polyethylene, or an acrylic resin.

A preferred electrical storage device in which the negative electrode active material of the present invention is used, may be a lithium ion capacitor wherein the positive electrode active material is a material capable of reversibly adsorbing or desorbing lithium ions and/or anions, and the negative electrode and/or the positive electrode is preliminarily doped with lithium ions so that the positive electrode potential after short-circuiting the positive electrode and the negative electrode becomes at most 2.0 V (vs Li/Li$^+$). Such a lithium ion capacitor is frequently used particularly for large current charging or discharging, wherein the negative electrode active material of the present invention functions particularly effectively, whereby low temperature characteristics will be excellent with a high energy density and a high output, such being desirable.

Further, in such a lithium ion capacitor, the positive electrode potential after short-circuiting the positive electrode and the negative electrode being at most 2.0 V (vs Li/Li$^+$) means a case where the positive electrode potential obtained by either one of the following methods (A) and (B) is at most 2.0 (vs Li/Li$^+$). Namely, (A) after being doped with lithium ions, the positive electrode terminal and the negative electrode terminal of the capacitor are directly connected by a conductive wire and left to stand for at least 12 hours, whereupon short-circuiting is released, and the positive electrode potential measured within a period of from 0.5 to 1.5 hours is at most 2.0 (vs Li/Li$^+$), or (B) by a charging and discharging tester, constant current discharge is carried out to 0 V over a period of 12 hours, whereupon the positive electrode terminal and the negative electrode terminal are connected by a conductive wire and left to stand for at least 12 hours, whereupon the short-circuiting is released, and the positive electrode potential measured within a period of from 0.5 to 1.5 hours is at most 2.0 V (vs Li/Li$^+$). Further, the positive electrode potential after short-circuiting the positive electrode and the negative electrode being at most 2.0 V (vs Li/Li$^+$) is not limited to immediately after lithium ions are doped, but means that the positive electrode potential becomes at most 2.0 V (vs Li/Li$^+$) after short-circuiting in any state such as short-circuiting during charging, during discharging or after repeating charging and discharging.

With the above lithium ion capacitor, before charging the lithium ion capacitor, the negative electrode and/or the positive electrode is preliminarily doped with lithium ions, and the positive electrode and the negative electrode are short-circuited, whereupon the positive electrode potential is made to be at most 2.0 V (vs Li/Li$^+$), whereby the utilization capacity of the positive electrode will be high to provide a high capacity, and a large energy density will be obtained. As the doped amount of lithium ions increases, the positive electrode potential at the time of short-circuiting the positive electrode and the negative electrode, tends to be low, and the energy density will be improved. In order to obtain a still higher energy density, at most 1.5 V (vs Li/Li$^+$) is preferred, and at most 1.0 V (vs Li/Li$^+$) is further preferred. If the amount of lithium ions doped on the positive electrode and/or the negative electrode is small, the positive electrode potential at the time of short-circuiting the positive electrode and the negative electrode tends to be higher than 2.0 V (vs Li/Li$^+$), whereby the energy density of the lithium ion capacitor tends to be small. Further, if the positive electrode potential is lower than 2.0 V (vs Li/Li$^+$), there will be a trouble such as gas generation or irreversible consumption of lithium ions, whereby the measurement of the positive electrode potential tends to be difficult, although such depends also on the positive electrode active material. Further, the positive electrode potential being too low means that the negative electrode weight is excessive, and the energy density rather tends to decrease. Usually, it is at least 0.1 V (vs Li/Li$^+$), preferably at least 0.3 V (vs Li/Li$^+$).

Doping of lithium ions may be on either one or both of the negative electrode and the positive electrode. However, for example, in a case where activated carbon is used for the positive electrode, if the doped amount of lithium ions increases and the positive electrode potential decreases, the lithium ions will be irreversibly consumed thus leading to a trouble such that the capacity of the lithium ion capacitor tends to decrease. Therefore, it is advisable to adjust lithium ions to be doped on the negative electrode active material and/or the positive electrode active material not to lead to such a trouble, by taking into consideration the respective electrode active materials. In the present invention, it is cumbersome from the viewpoint of the process to control the doping amount on the positive electrode active material and the doping amount on the negative electrode active material, and therefore, doping of lithium ions is preferably carried out on the negative electrode active material.

Further, in such a lithium ion capacitor, the capacitance per unit weight of the negative electrode active material is at least three times as large as the capacitance per unit weight of the positive electrode active material, and it is possible to obtain a lithium ion capacitor having a high voltage and a high capacity by adjusting the weight of the positive electrode active material to be heavier than the weight of the negative electrode active material. Further, at the same time, in a case where a negative electrode having a large capacitance per unit weight as compared with the capacitance per unit weight of the positive electrode, is used, it becomes possible to reduce the weight of the negative electrode active material without changing the amount of the potential change of the negative electrode, whereby the packing amount of the positive electrode active material will be large, and the capacitance and the capacity of the lithium ion capacitor will be large. It is preferred that the weight of the positive electrode active material is heavier than the weight of the negative electrode active material, more preferably from 1.1 to 10 times. If it is less than 1.1 time, the difference in the capacity tends to be small, and if it exceeds 10 times, the capacity may sometimes rather tend to be small, and the difference in thickness between the positive electrode and the negative electrode tends to be too large, such being undesirable from the construction of the lithium ion capacitor.

Further, the construction of the above lithium ion capacitor may, for example, be a cylindrical type wherein strip positive electrode and negative electrode are wound with a separator interposed, a rectangular type wherein at least three plate positive electrodes and negative electrodes are laminated with a separator interposed, or a film type wherein a laminate of at least three plate positive electrodes and negative electrodes laminated with a separator interposed, is sealed in an outer film. The structures of these lithium ion capacitors have already been known from e.g. WO00/07255, WO03/003395 and JP-A-2004-266091. Also in the present invention, the same structures as such conventional lithium ion capacitors may be adopted.

Now, the present invention will be described in detail with reference to Examples, but the present invention is by no means restricted to such Examples.

EXAMPLE 1

Preparation of Carbon Material, Evaluation of Physical Properties

Coke having an average particle size (D50) of 12 μm was selected as a starting material for the carbon material, and in order to eliminate a partial fluctuation of heat history, heat treatment was firstly carried out at 820° C. for two hours in a nitrogen atmosphere. Such heat-treated coke was pulverized in a ball mill to an average particle size (D50) of 5 μm to obtain a carbon material precursor.

The carbon material precursor was put into an ethanol solution having nickel nitrate hexahydrate dissolved so that it would be 5 wt % in terms of nickel metal to the carbon material precursor, and slurried. The slurried solution was stirred to be sufficiently uniform and then heated while being slowly stirred in a bath of 70° C. to remove the majority of ethanol. Thereafter, it was further dried in a constant temperature vessel at 70° C. for 24 hours to carry out drying by sufficiently evaporating ethanol. The dried product was put in a batch type electric furnace, and the temperature was raised to 1,000° C. in three hours in a nitrogen atmosphere and maintained at that temperature for two hours. After being left to cool, the sample was taken out, and in order to remove nickel therefrom, acid cleaning at 80° C. with 2 N HCl for 3 hours was repeated twice. After drying again to sufficiently remove water, the product was subjected to a ball mill again to adjust the particle size so that D50 would be 5.0 μm. A negative electrode carbon material sample 1 of the present invention was thus obtained. In the same manner, samples 2 to 5 were obtained by changing the treatment temperature to 1,500° C., 1,200° C., 800° C. and 600° C. The specific surface area and the pore property of each sample are shown in Table 1. Further, as Comparative Examples, with respect to sample 6 prepared by carrying out the heat treatment at 500° C. and sample 7 prepared in the same manner as sample 1 but immersed in ethanol having no nickel nitrate hexahydrate incorporated, the physical properties are also shown in Table 1.

contained, development of mesopores is inadequate, and the specific surface area also becomes large. Thus, in order to develop mesopores, it is preferred to carry out heat treatment at a temperature of from 600° C. to 1,500° C. in the presence of a transition metal.

EXAMPLE 2

A sample was prepared by using furan resin carbon and PAS as starting materials for the carbon material. Firstly, to furfuryl alcohol as a starting material for furan resin carbon, nickel nitrate hexahydrate was dissolved so that it would be 5 wt % in terms of nickel metal, and this solution was acidified by an addition of a small amount of dilute sulfuric acid and then held at 60° C. for 24 hours to cure the resin. The obtained black color resin was put in a batch type electric furnace, and in the same manner as in Example 1, the temperature was raised to 1,000° C. in 3 hours in a nitrogen atmosphere and held at that temperature for two hours. After being left to cool, the sample was taken out, and in order to remove nickel, acid cleaning at 80° C. with 2 N HCl for 3 hours was repeated twice. This sample was subjected to a ball mill so that D50 would be 5.0 μm to obtain a sample 8. Further, preparation of a PAS sample was also carried out. Firstly, a phenol resin molded plate having a thickness of 0.5 mm molded by dissolving nickel nitrate hexahydrate in an amount of 5 wt % in terms of nickel metal, was put in a Siliconit electric furnace and subjected to heat treatment by increasing the temperature at a rate of 50° C./hour to 500° C. and further at a rate of 10° C./hour to 650° C. in a nitrogen atmosphere thereby to synthesize a PAS plate. The PAS plate thus obtained was pulverized by a ball mill and subjected to similar acid cleaning to obtain a PAS powder sample 9 having D50 of 5.1 μm. The H/C ratio of this PAS powder was 0.22. Under the same conditions, using a phenol resin molded plate having a thickness of 0.5 mm formed without dissolving the nickel nitrate hexahydrate, the thermal treatment, pulverization and acid cleaning were carried out to obtain a PAS powder sample 10 adjusted so that D50 became 5.3 μm. The specific surface areas and the pore properties of samples 8, 9 and 10 thus obtained, are shown in Table 2.

TABLE 1

| Sample No. | Starting material | Added metal species | Treatment temperature ° C. | Specific surface area m²/g | Total mesopore volume cc/g | Proportion of 100-400 Å % |
|---|---|---|---|---|---|---|
| Sample 1 | Coke | Ni | 1,000 | 9.9 | 0.0166 | 41 |
| Sample 2 | Coke | Ni | 1,500 | 3.9 | 0.0151 | 35 |
| Sample 3 | Coke | Ni | 1,200 | 5.0 | 0.0154 | 38 |
| Sample 4 | Coke | Ni | 800 | 10.8 | 0.0068 | 54 |
| Sample 5 | Coke | NI | 600 | 13.9 | 0.0052 | 58 |
| Sample 6 | Coke | Ni | 500 | 15.2 | 0.0041 | 60 |
| Sample 7 | Coke | nil | 1,000 | 62.8 | 0.0039 | 23 |

As shown in Table 1, when a nickel salt as a transition metal salt is added, and the treatment temperature is from 600° C. to 1,500° C., the total mesopore volume is from 0.005 to 0.1 cc/g and volumes of mesopores having pore diameters of from 100 to 400 Å are at least 25% of the total meso volume, and thus, mesopores will develop and at the same time, the specific surface area becomes small at a level of from 0.01 to 50 m²/g. However, it is evident that at 500° C., development of mesopores is inadequate. Further, it is evident that even by treatment at 1,000° C., in a case where no transition metal is

TABLE 2

| Sample No. | Starting material | Added metal species | Treatment temperature ° C. | Specific surface area m²/g | Total mesopore volume cc/g | Proportion of 100-400 Å % |
|---|---|---|---|---|---|---|
| Sample 8 | Furan resin carbon | Ni | 1,000 | 12.1 | 0.0171 | 47 |
| Sample 9 | Coke | Ni | 650 | 43.3 | 0.0093 | 65 |
| Sample 10 | Coke | nil | 650 | 92.2 | 0.0019 | 23 |

As shown in Table 2, it is evident that also when PAS or a furan resin carbon as a hard carbon is used as the starting material, mesopores will be developed by adding a nickel salt as a transition metal salt and by thermal treatment at a temperature of from 600° C. to 1,500° C. Further, the sample 10 obtained by the thermal treatment without adding a nickel salt, became a sample wherein substantially no mesopores were present.

EXAMPLE 3

In the same manner as for the sample 1 in Example 1, a sample 11 obtained by changing only the type of the added transition metal salt to iron nitrate, and a sample 12 obtained by changing only the type of the added transition metal salt to copper nitrate, were prepared. The specific surface areas and the pore properties are shown in Table 3.

TABLE 3

| Sample No. | Starting material | Added metal species | Treatment temperature ° C. | Specific surface area m²/g | Total mesopore volume cc/g | Proportion of 100-400 Å % |
|---|---|---|---|---|---|---|
| Sample 11 | Coke | Fe | 1,000 | 27.2 | 0.0133 | 40 |
| Sample 12 | Coke | Cu | 1,000 | 55.9 | 0.0040 | 17 |

As shown in Table 3, in a case where the transition metal species of the transition metal salt to be added is iron, the mesopores will develop adequately, but in the case of copper, the development is inadequate. In order to develop mesopores, it is preferred to employ nickel and/or iron as the transition metal.

EXAMPLE 4

Preparation of Negative Electrode

To 92 parts by weight of the sample 3 and the sample 7, respectively, 6 parts by weight of an acetylene black powder, 5 parts by weight of an acrylate copolymer binder, 4 parts by weight of carboxymethyl cellulose (CMC) and 200 parts by weight of ion-exchanged water were added and sufficiently mixed by a mixing stirrer to obtain a negative electrode slurry 1 and a negative electrode slurry 2. The negative electrode slurry 1 or the negative electrode slurry 2 was applied on both sides of copper expanded metal (manufactured by NIPPON METAL INDUSTRY CO., LTD.) having a thickness of 32 μm (porosity: 57%) by means of a vertical die coater for both sides so that the coating weight of the active material would be the same on both sides, followed by drying to obtain a negative electrode 1 or a negative electrode 2 having a total thickness of 141 μm.

Preparation of Positive Electrode 100 parts by weight of a commercially available $LiCoO_2$ powder having a particle size of 5 μm and 5 parts by weight of a graphite powder were added to a solution having 3.5 parts by weight of a polyvinylidene fluoride powder dissolved in 50 parts by weight of N-methyl pyrrolidone, followed by thorough mixing to obtain a positive electrode slurry 1. An aqueous carbon type conductive coating material was coated simultaneously on both sides of an aluminum expanded metal (manufactured by NIPPON METAL INDUSTRY CO., LTD.) having a thickness of 38 μm (porosity: 45%) by means of a vertical die coater for both sides, followed by drying to obtain a current collector for a positive electrode having a conductive layer formed. The total thickness (the total of the thickness of the current collector and the thickness of the conductive layer) was 52 μm, and through-holes of the positive electrode current collector were substantially closed by the conductive coating material. The above mentioned positive electrode slurry 1 was applied on each side of the positive electrode current collector sequentially by a comma coater, followed by drying to obtain a positive electrode 1 having a thickness of 189 μm.

Preparation of Lithium Ion Secondary Battery

Each of the negative electrode 1 having a thickness of 141 μm and the positive electrode 1 having a thickness of 189 μm was cut in a rectangular shape of 2.4 cm×3.8 cm. Using a cellulose/rayon mixed non-woven fabric having a thickness of 35 μm as a separator, six negative electrodes and five positive electrodes were laminated, so that portions to be welded to connecting terminals (hereinafter referred to as connecting terminal welding portions) of the negative electrode current collectors and the positive electrode current collectors will be disposed alternately on the opposite sides. At the top portion and the bottom portion, separators were disposed, and the four sides were sealed by a tape to obtain an electrode-laminated unit "a". Then, positive electrode terminals made of aluminum and having a width of 10 mm, a length of 30 mm and a thickness of 0.2 mm, having a sealant film preliminarily heat-sealed at sealing portions, were overlaid on and ultrasonically welded to terminal welding portions (5 sheets) of the positive electrode current collectors of the above electrode-laminated cell "a". Likewise, negative electrode terminals made of nickel and having a width of 10 mm, a length of 30 mm and a thickness of 0.2 mm, having a sealant film preliminarily heat-sealed at sealing portions, were overlaid on and resistance-welded to terminal welding portions (6 sheets) of the negative electrode current collectors. Then, the cell was placed between two sheets of outer films deep-drawn to have a length of 60 mm, a width of 30 mm and a depth of 1.3 mm.

Two terminal sides and another side of the outer laminate films were heat-sealed, and then a solution having $LiPF_6$ dissolved at a concentration of 1 mol/liter in a mixed solvent of ethylene carbonate, diethylene carbonate and propylene carbonate in a weight ratio of 3:4:1 was vacuumed-impregnated as an electrolyte solution, whereupon the remaining one side was heat-sealed under reduced pressure to carry out vacuum sealing to assemble two cells of a film-type lithium ion secondary battery "a".

Likewise, using the negative electrode 2 and the positive electrode 1, two cells of a film type lithium ion secondary battery "b" were assembled.

Evaluation of Characteristics of Lithium Ion Secondary Batteries

Two cells of each of the prepared film type lithium ion secondary batteries "a" and "b" were charged with a constant current of 300 mA at 25° C. until the cell voltage became 4.2 V, and then a constant voltage of 4.2 V was applied. Such constant current-constant voltage charging was carried out for 6 hours. Thereafter, the respective cells were left to stand for 24 hours in constant temperature tanks of 25° C. and −10°

C., respectively and then discharged at a constant current of 150 mA until the cell voltage became 3.0 V. The discharge capacities at that time were measured, and the results are shown in Table 4.

TABLE 4

|  | Negative electrode material | Capacity at 25° C. (mAh) | Capacity at −10° C. (mAh) |
| --- | --- | --- | --- |
| Lithium ion secondary battery "a" | Sample 3 | 161 | 114 |
| Lithium ion secondary battery "b" | Sample 7 | 140 | 62 |

As shown in Table 4, with the lithium ion secondary battery "a" employing as a negative electrode active material the sample 3 wherein the total mesopore volume is within a range of from 0.005 to 0.1 cc/g and volumes of mesopores having pore diameters of from 100 to 400 Å occupy at least 25% of the total mesopore volume and wherein mesopores are developed and at the same time the specific surface area is small at a level of from 0.01 to 50 m$^2$/g, the capacity at each of 25° C. and −10° C. is large as compared with the lithium ion secondary battery "b" employing the sample 7 as a negative electrode active material. It is considered that as compared with the sample 7, the sample 3 has a small specific surface area, whereby the initial charging and discharging efficiency tended to be high, and the capacity at 25° C. became large. Further, it is considered that as compared with the sample 7, the sample 3 has mesopores developed, whereby even at a low temperature, the charge transfer resistance tended to be small, whereby the capacity became large.

EXAMPLE 5

Evaluation of Characteristics of Negative Electrodes

In the same manner as in Example 4, to 92 parts by weight of the sample 1, the sample 9 and the sample 10, respectively, 6 parts by weight of an acetylene black powder, 5 parts by weight of an acrylate copolymer binder, 4 parts by weight of a carboxymethyl cellulose (CMC) and 200 parts by weight of ion-exchanged water were added and thoroughly mixed by a mixer to obtain negative slurries 3, 4 and 5, respectively.

The obtained negative slurry 3, 4 or 5 was applied to one side of a copper foil having a thickness of 18 μm so that the coating weight of the active material would be 2.5 mg/cm$^2$ and vacuum-dried at 150° C. for 20 hours to obtain a negative electrode. Such electrodes were cut into a rectangular shape of 2.4 cm×3.8 cm to obtain negative foil electrodes 1, 2 and 3.

Using such a negative foil electrode 1, 2 or 3, a metal lithium having the same size and a thickness of 250 μm as a counter electrode and a polyethylene non-woven fabric having a thickness of 50 μm as a separator, two simulated laminate cells were assembled. Further, as a reference electrode, a lithium metal was employed. As the electrolyte solution, a solution having LiPF$_6$ dissolved at a concentration of 1 mol/liter in a mixed solvent of ethylene carbonate, diethyl carbonate and propylene carbonate in a weight ratio of 3:4:1, was employed.

Each of such simulated laminate cells was charged with a constant current of 30 mA at 25° C. until the negative electrode potential became 25 mV and then a constant voltage of 25 mV was applied, and such constant current-constant voltage charging was carried out for 12 hours. Then, each cell was discharged at a constant current of 3 mA until the negative electrode potential became 1.5 V, and the initial discharge capacity was measured. The results are shown in Table 5.

TABLE 5

|  | Negative electrode active material | Initial characteristics | | |
| --- | --- | --- | --- | --- |
|  |  | Charged amount mAh/g | Discharged amount mAh/g | Initial efficiency % |
| Negative foil electrode 1 | Sample 1 | 442 | 287 | 65.0 |
| Negative foil electrode 2 | Sample 9 | 596 | 379 | 63.6 |
| Negative foil electrode 3 | Sample 10 | 648 | 340 | 52.5 |

As shown in Table 5, with the samples 1 and 9 wherein the total mesopore volume is from 0.005 to 0.1 cc/g and volumes of mesopores having pore diameters of from 100 to 400 Å occupy at least 25% and wherein mesopores are developed and at the same time, the specific surface area is small at a level of from 0.01 to 50 m$^2$/g, the initial charge and discharge efficiency becomes high.

EXAMPLE 6

Preparation of Negative Electrodes

The above mentioned negative electrode slurries 3, 4 and 5 were applied to expanded metals made of copper (manufactured by NIPPON METAL INDUSTRY CO., LTD.) and having a thickness of 32 μm (porosity: 57%) by a vertical die coater for simultaneous coating on both sides so that the coating amount of the active material would be the same on both sides, and dried to obtain a negative electrode 3 having a total thickness of 119 μm, a negative electrode 4 having a total thickness of 142 μm and a negative electrode 5 having a total thickness of 144 μm.

Preparation of Positive Electrode

Sawdust was used as a starting material, and it was put into an electric furnace, heated to 950° C. at a temperature raising rate of 50° C./hr in a nitrogen stream and then activated with steam for 12 hours by a mixed gas of nitrogen/steam=1:1, to obtain activated carbon having a specific surface area of 2,450 m$^2$/g. Such activated carbon was pulverized for 5 hours in an alumina ball mill pulverizer to obtain an activated carbon powder having an average particle size (D50) of 7 μm.

92 Parts by weight of the above activated carbon powder for a positive electrode, 6 parts by weight of acetylene black powder, 7 parts by weight of an acrylate copolymer binder, 4 parts by weight of a carboxymethyl cellulose (CMC) and 200 parts by weight of ion-exchanged water were thoroughly mixed by a mixer to obtain a positive electrode slurry 2.

An aqueous carbon type conductive coating material was coated simultaneously on both sides of an expanded metal made of aluminum (manufactured by NIPPON METAL INDUSTRY CO., LTD.) and having a thickness of 38 μm (porosity: 45%) by a vertical die coater for simultaneous coating on both sides, and dried to obtain a current collector for a positive electrode having a conductive layer formed thereon. The total thickness (the total of the thickness of the current collector and the thickness of the conductive layer) was 52 μm, and through-holes of the positive electrode current collector were substantially closed with the conductive coating material. The above positive slurry 2 was applied on each side of the positive electrode current collector sequentially by a comma coater and dried to obtain a positive electrode 2 having a thickness of 260 μm.

Preparation of Lithium Ion Capacitors

Using the negative electrodes 3, 4 and 5 and the positive electrode 2, the respective electrode-laminated cells were obtained in the same manner as in Example 4. A lithium metal foil having a thickness of 60 μm was press-bonded to a stainless steel net having a thickness of 80 μm, and such an assembly was disposed at the outermost portion of each electrode-laminated cell to face the negative electrode. The negative electrodes (6 sheets) and the stainless steel net having the lithium metal press-bonded, were welded and contacted to obtain a tripolar laminated cell wherein the negative electrodes and the lithium metal foil were short-circuited. Then, positive electrode terminals made of aluminum and having a width of 12 mm, a length of 30 mm and a thickness of 0.2 mm, having a sealant film preliminarily heat-sealed to sealing portions, were overlaid to the terminal welding portions (5 sheets) of the positive electrode current collectors of the above tripolar laminated unit and ultrasonically welded. Likewise, negative electrode terminals made of nickel and having a width of 10 mm, a length of 30 mm and a thickness of 0.2 mm, having a sealant film preliminarily heat-sealed at sealing portions, were overlaid to the terminal welding portions (6 sheets) of the negative electrode current collectors, and resistance-welded. Such a unit was set between two sheets of outer films deep-drawn to have a length of 60 mm, a width of 30 mm and a depth of 1.3 mm.

Two terminal sides and another side of the external laminate films were heat-sealed, and then a solution having $LiPF_6$ dissolved at a concentration of 1 mol/liter in a mixed solvent of ethylene carbonate, diethyl carbonate and propylene carbonate in a weight ratio of 3:4:1, was vacuum-impregnated as an electrolyte solution, whereupon, the remaining one side is heat-sealed under reduced pressure for vacuum sealing, thereby to assemble three cells of each of film type lithium ion capacitors "c", "d" and "e".

Evaluation of Cell Characteristics of Lithium Ion Capacitors

After being left to stand at room temperature for 14 days, one cell was disassembled, whereby the lithium metal was found to have completely disappeared.

The remaining two cells of each of the film type lithium ion capacitors "c", "d" and "e" were left to stand for 24 hours at 25° C. and −20° C., respectively, and then charged at a constant current of 200 mA until the cell voltage became 3.8 V, and then a constant voltage of 3.8 V was applied, and such constant current-constant voltage charging was carried out for one hour. Then, discharging was carried out at a constant current of 20 mA until the cell voltage became 1.9 V. This 3.8 V-1.9. V cycle was repeated, and the discharge capacity of the third time was measured. The results are shown in Table 6.

TABLE 6

| Negative electrode active material | Discharge capacity | | Energy density |
|---|---|---|---|
| | 25° C. mAh | −20° C. mAh | 25° C. Wh/l |
| Lithium ion capacitor "c" | Sample 1 | 19.0 | 15.4 | 12.9 |
| Lithium ion capacitor "d" | Sample 9 | 16.9 | 13.2 | 10.9 |

TABLE 6-continued

| Negative electrode active material | Discharge capacity | | Energy density |
|---|---|---|---|
| | 25° C. mAh | −20° C. mAh | 25° C. Wh/l |
| Lithium ion capacitor "e" | Sample 10 | 16.4 | 9.5 | 10.5 |

Further, the positive electrodes and negative electrodes of each cell were short-circuited, whereby the positive electrode potential was measured. In each case, the positive electrode potential was within a range of from 0.80 to 0.95 V (vs $Li/Li^+$) and at most 2.0 V (vs $Li/Li^+$).

Lithium ion capacitors having high energy densities were obtained, since the positive electrode potentials after short-circuiting the positive electrodes and the negative electrodes were at most 2.0 V (vs $Li/Li^+$). Among them, the lithium ion capacitors "c" and "d" employing the sample 1 and the sample 9 had high capacities as compared with the lithium ion capacitor "e" employing the sample 10 even in comparison of the discharge capacities at 25° C. and −20° C. Also from such results, it is evident that also in lithium ion capacitors, it is preferred to employ as a negative electrode a carbon material having a specific surface area of from 0.01 to 50 $m^2/g$ and a total mesopore volume of from 0.005 to 1.0 cc/g and wherein volumes of mesopores having pore diameters or from 100 to 400 Å occupy at least 25%.

INDUSTRIAL APPLICABILITY

The negative electrode active material of the present invention is very useful as a negative electrode active material for an electrical storage device as a driving or auxiliary electrical storage source for electric automobiles, hybrid electric automobiles, etc. Further, an electrical storage device employing such a negative electrode active material is suitable as a is driving storage source for electric automobiles, mobilized wheel chairs, etc., an electrical storage device for various energy generation such as solar energy generation or wind power generation, or an electrical storage source for domestic electrical equipments.

The invention claimed is:

1. A negative electrode active material for an electrical storage device, comprising a carbon material having a specific surface area of from 0.01 to 50 $m^2/g$ and a total mesopore volume of from 0.005 to 0.0093 cc/g,
    wherein the carbon material includes mesopores having pore diameters of from 20 to 500 Å, and volumes of mesopores having pore diameters of from 100 to 400 Å occupy at least 25% of the total mesopore volume.

2. The negative electrode active material for an electrical storage device according to claim 1, wherein the carbon material comprises at least one selected from the group consisting of soft carbon, hard carbon and a polyacene material.

3. The negative electrode active material for an electrical storage device according to claim 1, wherein the carbon material is one obtained by thermally treating a precursor for the carbon material at a temperature of from 600° C. to 1,500° C. in a presence of a compound comprising at least one transition metal.

4. The negative electrode active material for an electrical storage device according to claim 3, wherein the at least one transition metal comprises at least one of nickel and iron.

5. A lithium ion secondary battery comprising the negative electrode active material as defined in claim 1.

6. A lithium ion capacitor comprising the negative electrode active material as defined in claim 1, further comprising a positive electrode active material capable of reversibly adsorbing or desorbing at least one of lithium ions and anions, wherein at least one of the negative electrode and the positive electrode is doped with lithium ions so that a positive electrode potential after short-circuiting the positive electrode and the negative electrode becomes at most 2.0 V (vs $Li/Li^+$).

7. The negative electrode active material for an electrical storage device according to claim 1, wherein the carbon material comprises the mesopores having pore diameters of from 100 to 400 Å which occupy 30 to 85% of the total mesopore volume.

8. The negative electrode active material for an electrical storage device according to claim 1, wherein the carbon material has a specific surface area of from 0.1 to 20 $m^2/g$.

9. The negative electrode active material for an electrical storage device according to claim 1, wherein the carbon material has an average particle diameter of from 0.5 to 30 μm.

10. The negative electrode active material for an electrical storage device according to claim 9, wherein the carbon material has an average particle diameter of from 0.5 to 10 μm.

11. The negative electrode active material for an electrical storage device according to claim 10, wherein the carbon material has an average particle diameter of from 0.5 to 2 μm.

* * * * *